March 3, 1942.   A. MOORHOUSE   2,275,156
VARIABLE SPEED TRANSMISSION
Filed Sept. 28, 1938   5 Sheets-Sheet 3

Inventor:
Alfred Moorhouse
By Edward C. Fitzhugh
Atty.

March 3, 1942.     A. MOORHOUSE     2,275,156
VARIABLE SPEED TRANSMISSION
Filed Sept. 28, 1938     5 Sheets-Sheet 5

Inventor:
Alfred Moorhouse
By Edward C. Fitzhugh
Atty.

Patented Mar. 3, 1942

2,275,156

UNITED STATES PATENT OFFICE 2,275,156

VARIABLE SPEED TRANSMISSION

Alfred Moorhouse, Detroit, Mich., assignor to Morse Chain Company, Ithaca, N. Y., a corporation of New York Application September 28, 1938, Serial No. 232,022

11 Claims. (Cl. 74—119)

This invention relates to infinitely variable speed transmissions of the ratcheting type, wherein a rotating cam or the like imparts to a series of planetarily arranged ratchet units, a succession of oscillatory movements which are transformed by the ratchet units into uni-directional rotational movement imparted to a driven element, and wherein means are provided for adjusting the length of stroke of the oscillating movement so as to adjust the speed of rotation imparted to the driven member.

An object of the invention is to provide a transmission of this general nature which may embody transmission elements of recognized suitability for sustained and efficient service, such as for example the conventional overrunning clutch and the simple planetary gear arrangement. To this end, the invention contemplates an arrangement in which the ratchet units, each embodying an overrunning clutch, are disposed in planetary relationship around the axis of the driving cam and driven gear, a simple lever arrangement transmits the motion of the cam to the driving element of the ratchet, and spur gears attached to the driven elements of the ratchets transmit the rectified movement to the driven gear. Adjustment of stroke is accomplished by varying the distance between the fulcrum of the cam follower lever and the ratchet axis.

Another object of the invention is to provide a transmission of the type specified, wherein a uniform velocity transmission ratio is maintained at all positions of adjustment of the mechanism. This object is attained in general, first, by generating the driving cam so that it will transmit substantially uniform angular velocity oscillation to the cam follower lever. In the second place, the effective lengths of the follower lever, the connecting link, and the clutch arm are so correlated that there will be substantially constant ratio of transmission of oscillation from the follower lever to the clutch arm. The parts are arranged so that the mid-point of the follower lever stroke will occur substantially simultaneously with the mid-point in the stroke of the clutch arm.

A further object of the invention is to provide a transmission of this character wherein the speed transmission ratio may be increased to infinity. This is accomplished by making the effective length of the follower lever equal to that of the connecting link and arranging for the pivot which connects the link to the ratchet arm to become aligned with the axis of the cam follower lever when in the infinite ratio setting, so that the link and lever may move as a unit without affecting the position of the ratchet arm.

Another object of the invention is to provide a transmission of the type specified which is relatively compact in arrangement.

Other objects, the advantages and uses of the invention will become apparent after reading the following specification and claims, and after consideration of the drawings forming a part of the specification, wherein:

Figure 5:
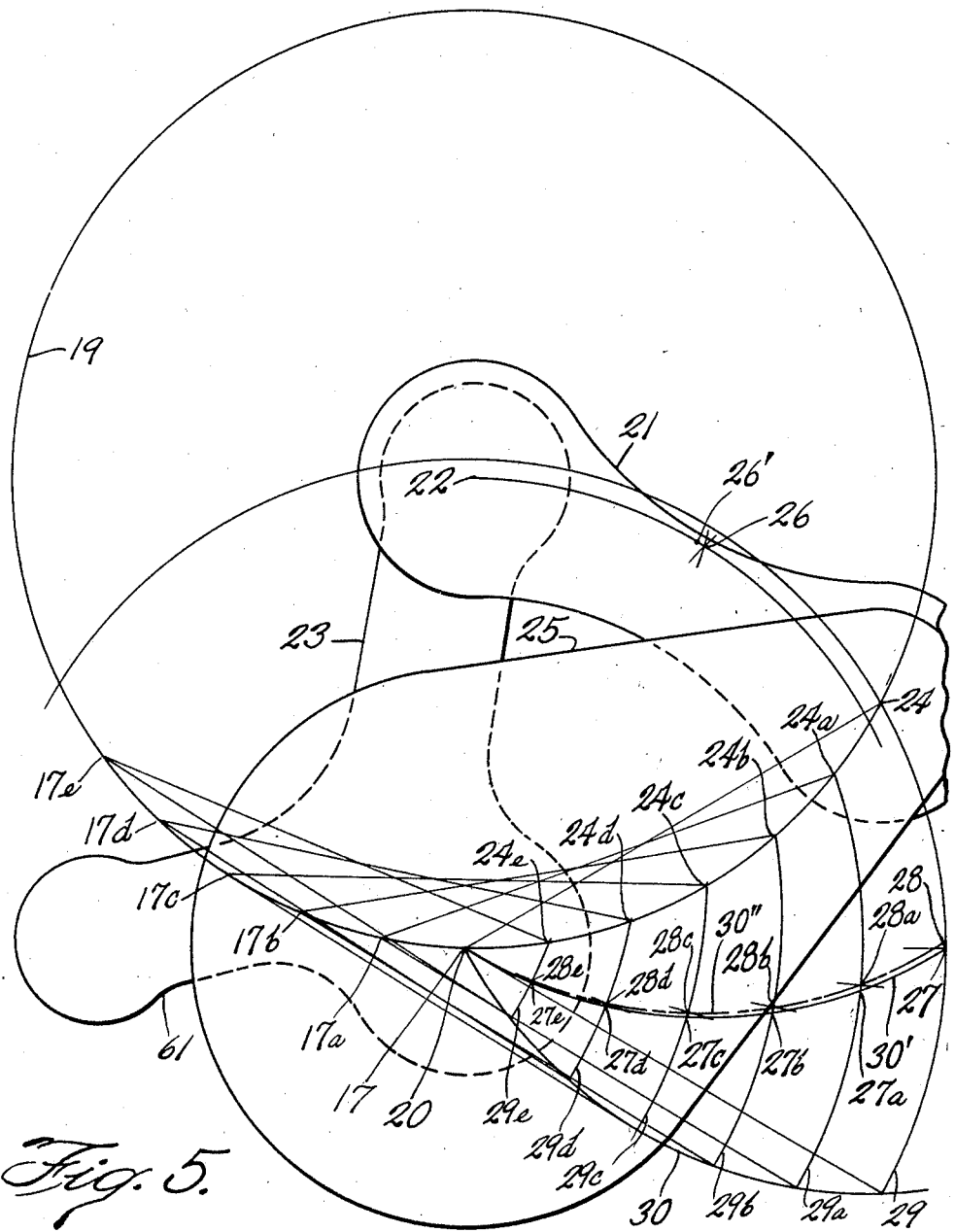
Figure 6:
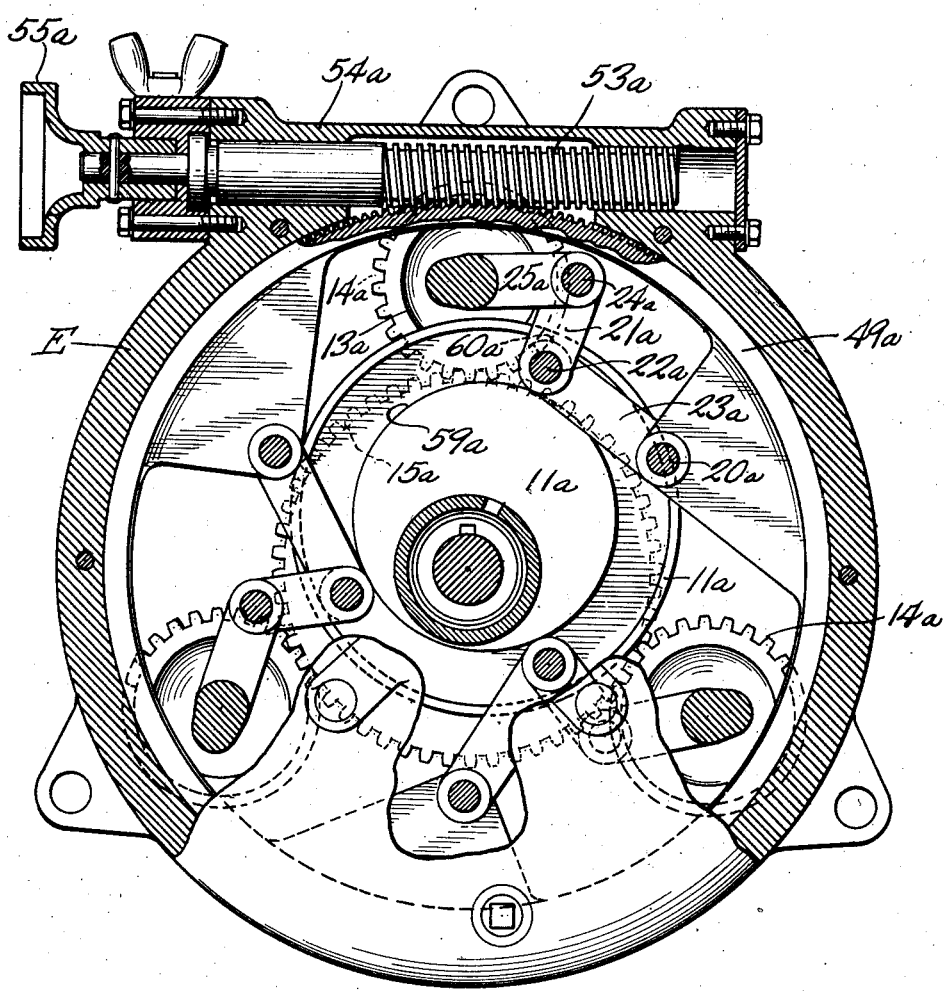

Fig. 5 is a diagram illustrating the stroke amplitude at equally spaced intervals throughout the entire range of stroke adjustment, and indicating how correction is made for error in coincidence of the mid-points of the lever and ratchet strokes so as to give an approximately uniform coincidence throughout the entire range; and Fig. 6 is a transverse sectional view of a modified form of the invention.

Figure 1:
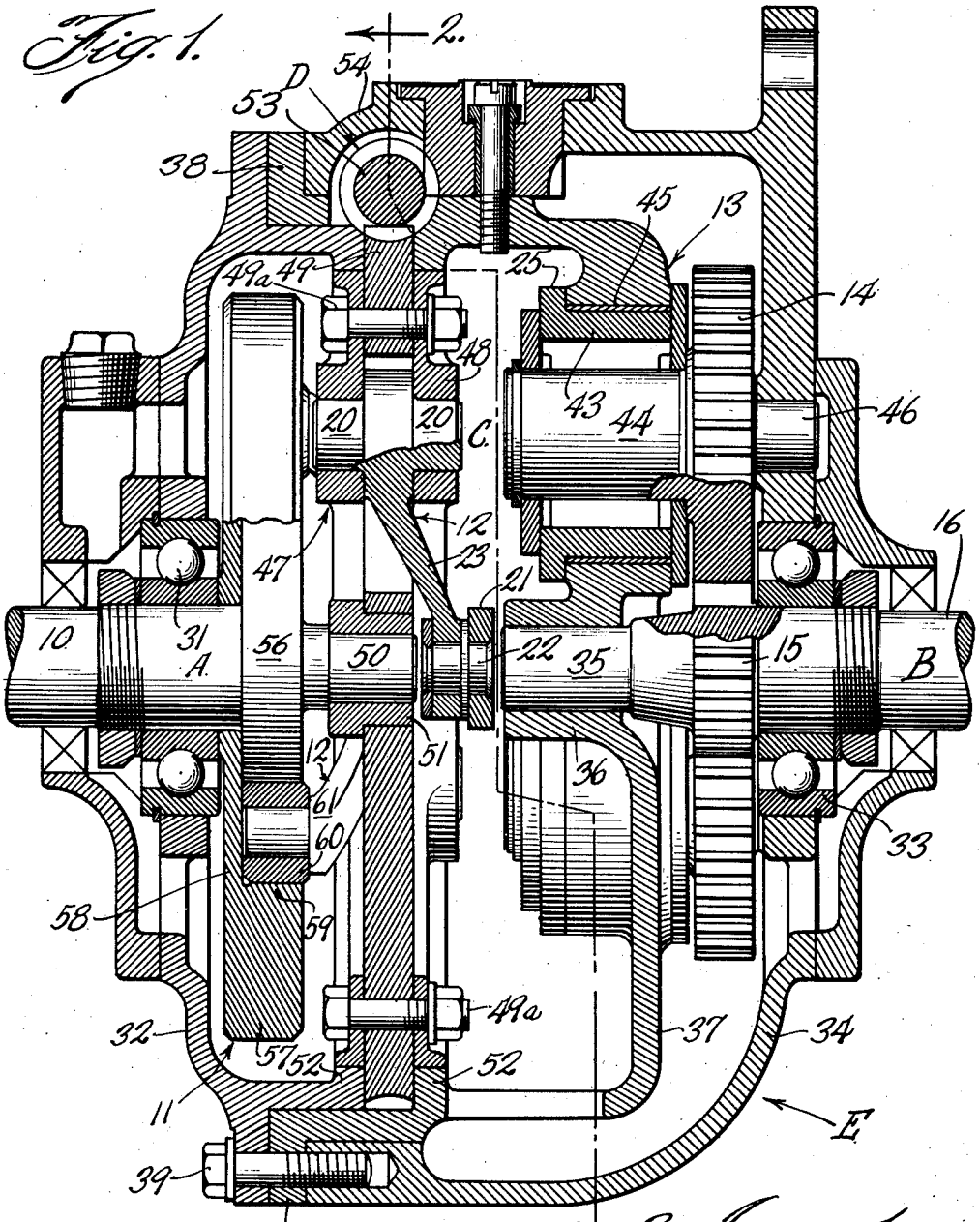
Fig. 1 is an axial sectional view of an infinitely variable transmission embodying the invention.

The transmission shown in Fig. 1 as an illustration of one form in which the invention may be embodied, comprises, in general, a driving member A, a driven member B, a plurality of adjustable transmitting units C forming a variable drive connection between the members A and B, adjusting mechanism D for adjusting the stroke amplitude so as to vary the ratio of transmission through the units C, and the housing E in which the several units and elements are encased and correlated.

The driving member A includes a drive shaft 10 and a cam 11, the latter adapted to impart oscillating movement to a series of bell crank levers 12 each forming part of a respective transmitting unit C. The oscillating movement thus developed in the bell crank levers 12 is transmitted to a series of ratchets 13, which rectify the movement back to uni-directional rotation transmitted to the driven member B through the medium of gears 14, each forming a part of the driven element of a respective ratchet, and a driven gear 15 secured to or formed integrally with the driven shaft 16 of the driven element B.

The adjustment of the transmission ratio is effected by adjusting the amplitude of the effective stroke of the oscillating linkage of the transmitting units C. The stroke is adjusted by varying the circumferential relationship between the planetarily arranged ratchets 13 and certain pivots of the oscillating linkage of the units C.

Figure 4:
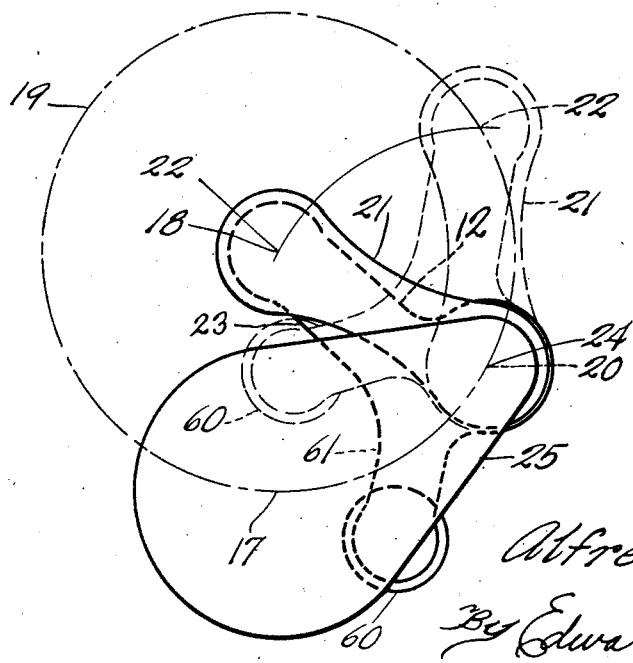
Fig. 4 is a similar view illustrating the amplitude of movement of the parts when at the other limit of stroke adjustment.

The ratchets 13 are located on fixed axes, indicated at 17 in Fig. 4, equi-distant from the common axis 18 of the driving and driven members A, B, and equi-distant from each other. The circumference on which the axes 17 are located is indicated at 19. The bell crank levers 12, on the other hand, are fulcrumed on axes, indicated at 20, which are adjustable circumferentially.

Oscillating movement is transmitted from each bell crank lever 12 to its ratchet 13 by means of a link 21 which is pivoted at 22 to the end of the lever arm 23 of the bell crank lever 12, and which at its other end is pivoted, at 24, to the end of an arm 25 forming part of the driving element of the ratchet 13.

In the preferred form of the invention, the effective lengths of the lever arm 23 and the link 21, are equal, whereby the lever fulcrum 20 may be adjusted toward the link-to-arm pivot 24 until it registers therewith. This position of registry, shown in Fig. 4, forms one limit of the adjustment, and may be referred to as the infinite ratio or zero movement position, since the oscillating movement of the bell crank lever 12 will, in that position, when transmitted to the link 21, simply cause the latter to oscillate around its pivotal connection 24 to the arm 25 without changing the position of the pivot 24, i. e., without transmitting movement to the ratchet. The range of stroke of a transmitting unit, when adjusted to this position, is indicated in Fig. 4, one limit of movement being shown in full lines and the other, in dotted lines.

Figure 3:
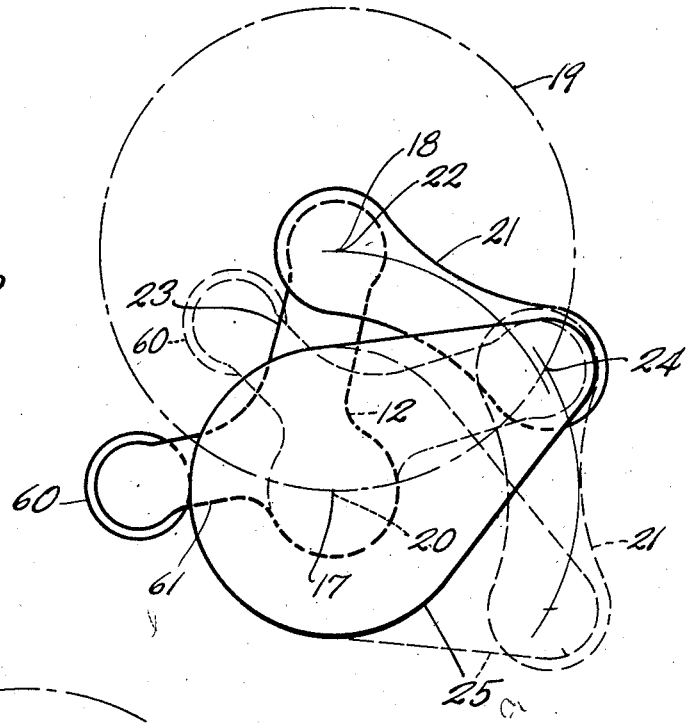
Fig. 3 is a schematic view of one of the transmitting units illustrating the amplitude of movement of the parts when at one limit of stroke adjustment.

In the maximum stroke position of adjustment, shown in Fig. 3, the bell crank lever fulcrum 20 has been moved away from the link-to-arm pivot 24 into registry with the ratchet axis 17. In this position of adjustment, the angular movement of the arm 25 will be equal to that of the bell crank lever 12, the limits of movement being indicated in full lines and dotted lines respectively.

Intermediate the two extremes of adjustment, the angular movement of the arm 25 will be increasingly less than that of the bell crank lever as the fulcrum 20 approaches the pivot 24.

It will be understood that either the ratchet axes or the lever fulcrums, or both, may be made adjustable circumferentially, the important object to be attained in this connection being the variation of the distance between the ratchet axes and the link-to-arm pivots. I find, however, that it is preferable to have the ratchet axes fixed and the lever fulcrums adjustable.

Figure 2:
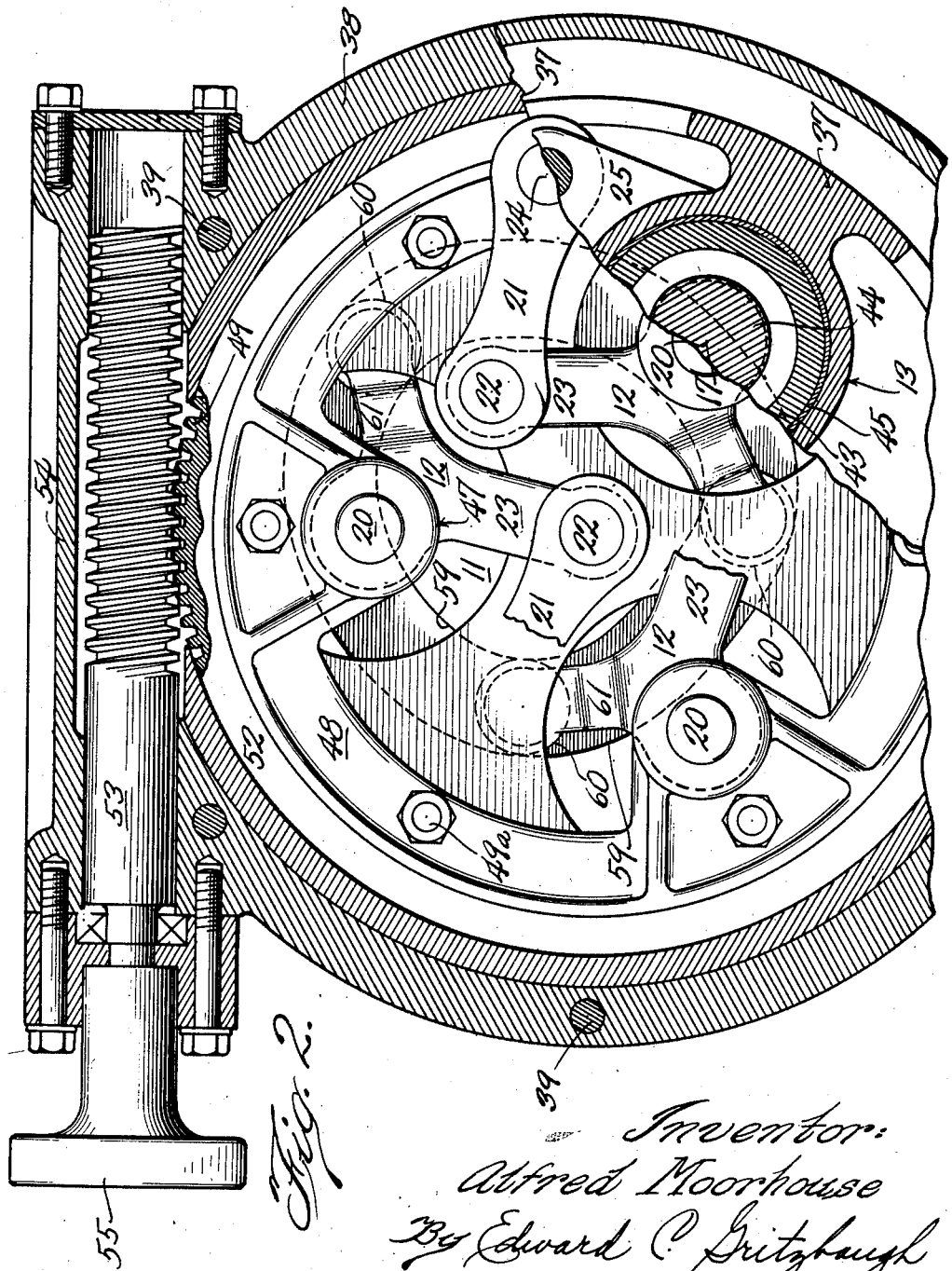
Fig. 2 is a transverse sectional view of the same, taken as indicated by the line 2—2 of Fig. 1.

Maximum compactness is achieved by arranging for the lever arms 23 and links 21 at one limit of movement, to project radially inwardly to the common axis 18. I find that it is possible to design the cam 11 to secure the particular uniform velocity, a fact which will be elaborated upon hereinafter, and at the same time to arrange the bell crank levers 12 and links 21 so that only one set will occupy this central space at any given time, the other two units being in different stages of movement away from the common center, as indicated in Fig. 2. As the linkage of one unit moves toward the center, the linkage of another unit, which has previously occupied the central position, will move away from the center, just clearing the inwardly moving unit sufficiently to avoid contact of any of the moving parts. By this arrangement, it is possible to employ identical transmitting units, the links being all mounted in a common plane and the levers all being mounted in a common plane, etc.

A constant velocity transmission ratio is an important object of the preferred form of the invention. The end sought to be attained is to make the ratio between the velocities of the driving and the driven shafts a uniform ratio for any given position of stroke adjustment. While it is at present considered impossible, at least in connection with the particular type of transmission herein dealt with, having the other advantages characteristic of the invention, to secure perfect uniformity of velocity ratio, the present invention does approach very closely to this optimum desideratum. To this end, the cam 11 is generated so as to impart substantially uniform angular velocity to the bell crank lever 12, and the linkage is arranged so that the lever will transmit oscillation to the ratchet arm at a substantially uniform velocity ratio in any position of adjustment. The link-to-arm pivot and the ratchet axis are located on a common circumference (the circumference 19) at the beginning of a stroke. The effective lengths of the link and bell crank lever are substantially the same, and the length of the ratchet arm fairly closely approaches that of the link and bell crank lever. Under these conditions, with the parts in the position of adjustment shown in Fig. 3 when the link-to-lever pivot 22 reaches the mid-point of its stroke (indicated at 26 in Fig. 5), the link-to-arm pivot 24 will have reached a position, indicated at 27, which coincides with the mid-point, indicated at 28, of its stroke.

In intermediate positions of adjustment there is a divergence between the actual position of the pivot 24 when the pivot 22 is at its mid-point 26, and the mid-point of its stroke. To illustrate this, I have indicated in Fig. 5 a number of equally spaced positions of adjustment of the transmitting unit, from maximum position wherein the amplitude of swing of the pivot 24 is indicated by the line 29, through the several intermediate positions in which the amplitude of swing of the pivot 24 is indicated by the lines 29a, 29b, 29c, 29d and 29e, respectively, to the position in which the pivot 24 registers with the fulcrum 20 and the amplitude is zero. The location of the pivot 24 at the beginning of the several strokes 29, 29a, 29b, etc. is indicated at 24, 24a, 24b, 24c, 24d and 24e respectively. The ratchet axis, in the several positions of adjustment, is indicated at 17, 17a, 17b, 17c, 17d and 17e, respectively. (For the purpose of the diagram, the fulcrum 20 is shown in a fixed position, and the ratchet axis is indicated as being adjustable). The circumference 19 marks the beginning of each of the strokes 29, 29a, etc. The line 30 marks the end of each stroke 29, 29a, etc. The line 30' marks the points 27, 27a, 27b, 27c, 27d, 27e reached by the pivot 24 when the pivot 22 reaches its mid-point 26. The points 28, 28a, 28b, 28c, 28d and 28e are the true mid-points of the strokes 29, 29a, etc. for the various positions of adjustment. The spacing between the points 27a and 28a, 27b and 28b, etc. indicates the magnitude of error in coincidence between the true mid-points of swing of the pivot 24 and the points actually reached when the pivot 22 reaches its mid-point.

It will be noted that there is no error at the two extreme positions 27 and 28, and that the error in the intermediate positions varies without absolute uniformity.

The invention involves the discovery that almost complete correction may be made by establishing an arbitrary center line 30", the crossing of which by the pivot 24 will occur when the pivot 22 is still somewhat short of its mid-point 26, i. e., when it has reached the position indicated at 26'. In turn, the cam 11 is generated so that (assuming the velocity of rotation of the driving shaft 10 is uniform) the time interval consumed in the passage of the pivot 22 from its starting position to the corrected mid-point 26' will be equal to that consumed in completing the stroke from the arbitrary mid-point 26' to the end of the stroke. Subject to this correction, the cam is generated so as to impart uniform velocity to the bell crank lever, i. e. the aggregate velocity is substantially uniform, but not completely so, being somewhat retarded during the first half of the stroke and accelerated during the last half.

It may be noted that the corrected center line 30" very nearly coincides with the true mid-points 28, 28a, etc. for most of the positions of adjustment.

By arranging for the pivot 24 to reach its approximate mid-point 26' mid-way in time between the beginning and end of the bell crank stroke, the time intervals occupied in the respective halves of its stroke, will be substantially equal. This constitutes a maximum approach toward constant velocity ratio of transmission of movement from the cam 11 to the driven gear 15.

The structural details of the preferred form of the invention will now be considered. The shaft A is mounted for rotation in a bearing 31, which in turn is mounted in the cover plate 32 of the housing E. The driven shaft B is mounted for rotation in a bearing 33, which in turn is mounted in the main body portion 34 of the housing E. The driven shaft 16 has an inner reduced end 35, which is journalled in a bearing 36 formed at the center of a spider 37, the peripheral region 38 of which is interposed between the cover plates 32 and the housing body 34, the entire assembly being secured together by bolts or cap screws 39.

The driving element of the ratchet 13 is in the form of a sleeve 43 secured to or formed integrally with the arm 25, and the driven element includes a core element 44 disposed within the sleeve 43 and coacting therewith through suitable one-way driving means. The gear 14 may be formed integrally with the core 44. The sleeve 43 is journalled for rotation in a bearing bushing 45 mounted in the spider 37, and the core 44 has a trunnion 46 which is journalled in the housing body 34.

The fulcrums 20 of the bell crank lever 12 are in the form of trunnions as shown in Fig. 1, formed integrally with the bell crank levers and journalled in an adjustable carriage 47 comprising two side plates or spiders 48 separated by a ring gear 49 and secured thereto by bolts 49a. The bell crank levers 12 are received between the side plates 48 as shown in Fig. 1, and the lever arms 23 are inclined laterally from the central plane of the carriage 47 so as to clear the inner end trunnion 50 of the driving element A, and the bearing 51 in which the trunnion 50 is journalled. The bearing 51 is formed integrally with the outer side plate 48 of the carriage 47.

The ring gear 49 projects between spaced flanges 52 formed on the cover plate and spider 37 respectively, whereby the carriage 47 is securely supported against movement in any direction except a circumferential one. The peripheries of the side plates 48 bear against the inner peripheries of the flanges 52 so as to center the carriage 47.

The carriage 47 may be adjusted circumferentially by means of a worm 53 journalled in a bearing 54 formed in the housing body 34. The hand wheel 55 on the outer end of the worm 53 serves for manual operation of the worm.

The cam 11 includes a central cam portion 56, formed integrally with the shaft 10, and a peripheral cam portion 57 having a web portion 58 by means of which it is secured upon the shaft 10, preferably by pressing the shaft into the opening in the web. Between the peripheral portion 57 and the central portion 56 of the cam, there is formed a cam groove 59 which receives the rollers 60 of the bell crank levers 12. The rollers 60 are journalled on the ends of arms 61 forming part of the bell crank levers 12. Each arm 61 is arranged at the proper angle with reference to its corresponding lever arm 23, so that when the latter is in its beginning limit of movement as shown in Figs. 3 and 4, in full lines, the roller 60 will be at its maximum distance from the common axis 18 of the driving and driven members, and when the lever arm 23 is at the end limit of movement, the roller 60 will be at minimum distance from the common axis 18. Between the lever arms 23 and 61, each bell crank lever is shaped so as to receive the joined ends of the link and lever of an adjacent unit.

In the form of the invention shown in Fig. 6, the operating lever 23a, instead of a bell crank lever, is in the form of a simple lever fulcrumed at 20a at one end and pivoted at 22a at its other end to the link 21a. The other end of the link 21a is pivoted at 24a to the ratchet arm 25a of the ratchet 13a. In this form of the invention, as well as in the preferred form, stroke adjustment is effected by moving the fulcrum 20a relative to the pivot 24a, by means of the ring gear 49a to which the fulcrum 20a is attached. The roller 60a, instead of being mounted on a separate arm of a bell crank lever, is mounted directly on the pivot 22a connecting the lever 23a and the link 21a. The roller 60a travels in the cam groove 59a in a cam 11a. Adjustment is effected by means of a worm 53a, journalled in bearings 54a in the housing E, and operated by a hand wheel 55a. The drive from the ratchet 13a to the driven gear 15a through the medium of gears 14a may be the same as in the preferred form of the invention.

In each form of the invention, the operation is as follows:

Rotation of the driving cam causes the levers 23, 23a to be oscillated around their fulcrums 20, 20a, the stages of oscillating movement of the several units being staggered with relation to each other so that at all times at least one of the ratchet devices will be transmitting movement to the driven element. Oscillating movement of the levers is transmitted through the links 21, 21a, to the arms 25, 25a. Movement in one direction causes the driven elements of the overrunning clutches to be rotated so as to transmit rotation through the gears 14, 14a, to the gears 15, 15a. Movement in the opposite direction is a ratcheting one, the gears 14, 14a being unaffected. Thus, while one of the overrunning clutches is transmitting movement, another one will be ratcheting back to its starting position so as to be ready to transmit rotation when its turn comes.

Movement of the levers in both directions is enforced by the cam so as to insure complete ratcheting cycles.

Stroke adjustment is accomplished by moving the lever fulcrum toward or away from the link-to-arm pivot, thereby varying the relation between the angular movement of the lever and the angular movement of the ratchet arm induced thereby. The lever, link and arm, are each attached at each end to another element so that their relation to each other at any given point in a cycle of movement, for any given position of adjustment, must always be the same. The construction and arrangement as a whole is fairly simple, and the ratcheting mechanism may be a standard overrunning clutch, eliminating the necessity of producing a special clutch for the purpose.

In addition to the above advantages, the preferred form of the invention has the advantages of additional compactness provided for by rearrangement of the linkage, greater range of stroke amplitude, and constant velocity ratio or substantially constant velocity ratio for all positions of adjustment. The lever and link are the same in effective length so as to allow adjustment to a zero position, and the ratchet arm is made substantially the same length in order to most closely approach the optimum condition of uniformity of ratio between the angular velocity of the lever and that of the arm in all positions of adjustment. While considerable latitude may be observed in the relation between the lengths of the arm 25 and that of the arms 21 and 23, the most satisfactory lengths, for the attainment of the objects in view is that given.

I claim:

1. In an infinitely variable transmission, coaxial rotary driving and driven members, a plurality of transmitting units arranged around the axis of rotation of said members, said units comprising levers fulcrumed on a circumference about the common axis, for oscillating movement which they are adapted to receive from said driving member, a link pivoted to the free end of each lever on a pivot adapted to substantially align with said common axis when at one limit of said oscillating movement, and to substantially register with the said circumference when at the other limit of oscillating movement, a ratchet having an arm the free end of which is pivoted to said link to receive oscillating movement transmitted from said lever, said ratchet being adapted to intermittently transmit uni-directional rotative movement to the driven member, and means for varying the distance between the lever fulcrum and the pivot connecting the link and ratchet arm, whereby to vary the ratchet stroke.

2. In an infinitely variable transmission, coaxial rotary driving and driven members, a plurality of transmitting units arranged around the axis of rotation of said members, each of said units comprising a lever fulcrumed on a circumference about the said axis at a radial distance from said axis substantially equal to the length of the lever, said lever being adapted to receive oscillating movement from the driving member, a link pivoted to the free end of the lever on a pivot adapted to substantially align with said axis when at one limit of the oscillating movement, and to substantially register with said circumference when at the other limit of oscillating movement, a ratchet having an arm the free end of which is pivoted to said link to receive oscillating movement transmitted from said lever, said ratchet being adapted to intermittently transmit uni-directional rotative movement to the driven member, and means for varying the distance between the lever fulcrum and the link-to-ratchet arm pivot, whereby to vary the ratchet stroke.

3. A transmission as defined in claim 2, wherein the effective length of said lever is substantially the same as that of said link, and wherein the link-to-arm pivot may be brought into substantial alignment with the lever fulcrum so as to reduce the stroke to substantially zero.

4. A transmission as defined in claim 2, wherein the ratchet axis lies on the aforesaid circumference, wherein the effective length of the lever, the link, and the ratchet arm, are substantially equal, and wherein the link-to-arm pivot is adapted to move from a position in substantial alignment with the fulcrum, in which position the ratchet stroke is substantially zero, to a position wherein the lever, link, and arm form substantially an equilateral triangle with respect to each other in one position of movement of the unit.

5. In an infinitely variable transmission, a driving member, a lever fulcrumed at one end for oscillating movement which it is adapted to receive from said driving member, a link pivoted to the other end of said lever, a ratchet having an arm one end of which is pivoted to the other end of said link so as to receive oscillating movement transmitted from said lever, a driven member adapted to intermittently receive uni-directional rotative movement from the driven element of said ratchet, and means for varying the spacing between said fulcrum and the link-to-arm pivot whereby to vary the length of the ratchet stroke, the effective length of the lever, link, and ratchet arm being substantially equal, and said lever, link and arm being adapted to move from one extreme of adjustment in which they collectively form substantially an equilateral triangle to another extreme of adjustment in which the link-to-arm pivot is in alignment with the lever fulcrum, in which latter position of adjustment the stroke is reduced to zero.

6. In an infinitely variable transmission, a lever fulcrumed for oscillating movement, a cam so generated and arranged as to impart substantially constant angular velocity oscillating movement to said lever, a link pivoted to the free end of the lever, a ratchet having a driven element adapted to intermittently impart uni-directional rotative movement to a driven member of the transmission, and a driving element having an arm the free end of which is pivoted to the other end of said link so as to receive oscillating movement from the lever, the effective lengths of the lever and link being substantially equal to each other and to the radius of a circumference around which the axis of the ratchet is adjustable for varying the spacing between the fulcrum and the arm-to-link pivot for adjustment of the stroke, whereby the transmission of oscillating movement to the arm is of substantially constant velocity in any position of such adjustment.

7. In an infinitely variable transmission, a driving cam, a driven gear coaxial therewith, a plurality of transmitting units arranged around the common axis of said cam and gear, each of said units comprising a lever fulcrumed for oscillating movement which it is adapted to receive from the cam, a link pivoted to the free end of the lever, an overrunning clutch having an arm the free end of which is pivoted to said link to receive oscillating movement transmitted from said lever, a gear on the driven element of said clutch adapted to intermittently transmit uni-directional rotative movement to the driven gear, and means for varying the distance between the lever fulcrum and the link-to-arm pivot, whereby to vary the rate of transmission, said cam being generated so that the error in coincidence of the mid-points of the lever and clutch strokes respectively, occurring as a result of the adjustment of the stroke, is corrected to substantially a mean error for all positions of such adjustment.

8. A transmission as defined in claim 7, wherein, subject to said correction, the cam is generated to induce substantially uniform angular velocity in the lever stroke.

9. In an infinitely variable transmission, coaxial rotary driving and driven members, a plurality of transmitting units arranged around the axis of rotation of said members, each of said units comprising a lever fulcrumed on a circumference about the said axis at a radial distance from said axis substantially equal to the length of the lever, said lever being adapted to receive oscillating movement from the driving member, a link pivoted to the free end of the lever on a pivot adapted to substantially align with said axis when at one limit of the oscillating movement, a ratchet having an arm the free end of which is pivoted to said link to receive oscillating movement transmitted from said lever, said ratchet being adapted to intermittently transmit uni-directional rotative movement to the driven member, and means for varying the distance between the lever fulcrum and the link-to-ratchet arm pivot, whereby to vary the ratchet stroke.

10. A variable speed mechanism comprising a driving shaft, adapted to be rotated at a substantially constant speed, a driven member adapted to be oscillated through an arc varying from zero degrees to a predetermined maximum, a crank fixed on the driven member, a fulcrum member pivoted about the axis of the driving shaft, a power transmitting lever, a fulcrum pin for pivoting the lever on the fulcrum member at a point spaced from the axis of the driving shaft, means connecting the driving shaft and lever for oscillating the lever through a predetermined arc as the shaft is rotated, a link pivotally connected at one end to the driven crank and pivotally connected at its other end to the power transmitting lever at a point that swings through an arc extending through the axis of the driving shaft, the distance between the two end axes of the link being the same as the distance between the lever fulcrum and the axis of the driving shaft, and means for adjusting the fulcrum member about the axis of the driving shaft from a minimum drive position when the lever fulcrum axis coincides with the axis of connection between the driven crank and link to a maximum drive position when these last mentioned axes are most remote from one another.

11. In an infinitely variable transmission, driving and driven members, a lever fulcrumed on a circumference about the axis of the driving member, said lever being adapted to receive oscillating movements from the driving member, a link pivoted to the free end of the lever on a pivot adapted to substantially align with the axis of the driving member when at one limit of said oscillating movement, a crank arm mounted on the driven member and pivoted at its free end to said link to receive oscillating movement transmitted from said lever, and means for varying the distance between the lever fulcrum and the pivot between said crank and the link, whereby to vary the amplitude of movement imparted to said crank arm.

ALFRED MOORHOUSE.